(12) United States Patent
Russell et al.

(10) Patent No.: US 10,055,200 B1
(45) Date of Patent: Aug. 21, 2018

(54) CREATION AND USE OF DEVELOPMENT PACKAGES

(71) Applicant: EMC Corporation, Hopkinton, MA (US)

(72) Inventors: James Russell, Pleasant Grove, UT (US); Ryan Gifford, Eagle Mountain, UT (US); Felippe Burk, Herriman, UT (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 15/084,285

(22) Filed: Mar. 29, 2016

(51) Int. Cl.
*G06F 9/44* (2018.01)
*G06F 8/30* (2018.01)

(52) U.S. Cl.
CPC ..................... *G06F 8/30* (2013.01)

(58) Field of Classification Search
CPC ....................................................... G06F 8/30
See application file for complete search history.

(56) References Cited

U.S. PATENT DOCUMENTS

| | | | |
|---|---|---|---|
| 6,298,478 B1 | 10/2001 | Nally | |
| 6,405,364 B1 | 6/2002 | Bowman-Amuah | |
| 6,701,514 B1 | 3/2004 | Haswell | |
| 6,859,922 B1 | 2/2005 | Baker | |
| 6,907,546 B1 | 6/2005 | Haswell | |
| 7,152,229 B2 | 12/2006 | Chong | |
| 7,203,928 B2 | 4/2007 | Mandava | |
| 7,496,906 B2 | 2/2009 | Black-Ziegelbein | |
| 7,873,946 B2 | 1/2011 | Lathrop | |
| 7,992,133 B1 | 8/2011 | Theroux | |
| 8,024,708 B2 | 9/2011 | Demetriou | |
| 8,549,475 B1 | 10/2013 | Cameron | |
| 8,677,315 B1 | 3/2014 | Anderson | |
| 8,689,188 B2 | 4/2014 | Bassin | |
| 8,799,868 B2 | 8/2014 | Ndem | |
| 8,904,357 B2 | 12/2014 | Eade | |
| 8,966,454 B1 | 2/2015 | Michelsen | |
| 9,183,123 B2 | 11/2015 | Spektor | |
| 9,268,597 B2 | 2/2016 | Bradshaw | |
| 9,292,276 B1 * | 3/2016 | Chou | G06F 8/65 |
| 9,396,037 B2 | 7/2016 | Morsi | |
| 9,489,647 B2 | 11/2016 | Martinez | |
| 2006/0195831 A1 * | 8/2006 | Bossom | G06F 9/4448 717/162 |

(Continued)

OTHER PUBLICATIONS

U.S. Appl. No. 15/084,242, filed Mar. 29, 2016, James Russell, et al.

(Continued)

*Primary Examiner* — Viva Miller
(74) *Attorney, Agent, or Firm* — Workman Nydegger

(57) ABSTRACT

In one example, a method includes defining a development package structure, and refining the development package structure to include a definition directory, an implementation directory that includes one or more containers, a service directory, and a test directory. Next, one or more of the definition directory, the implementation directory, the service directory, and the test directory are populated. Finally, the developer code is uploaded to the development package, and the development package is stored.

20 Claims, 6 Drawing Sheets

(56) References Cited

U.S. PATENT DOCUMENTS

2009/0249299 A1* 10/2009 Farchi ................. G06F 11/3676
717/125
2009/0271451 A1* 10/2009 Young ............... G06F 17/30115
2010/0057735 A1* 3/2010 Srinivasan ............... G06K 9/62
707/E17.014

OTHER PUBLICATIONS

Galik et al, "Generating Connectors for Heterogeneous Deployment", ACM, pp. 54-61, 2005.
Krupezak et al, "Increasing the Portability and Re-Usability of Protocol Code", IEEE/ACM Transactions on Networking, vol. 5, No. 4, pp. 445-459, 1997.
Jenkins, "Getting Started with Pipelines", Google Serach, pp. 1-9, 2017: https://jenkins.io/pipeline/getting-started-pipelines/.
U.S. Appl. No. 15/084,242, Apr. 27, 2017, Office Action.
Earl et al,"Verifying Fault-Tolerant Erlang Programs", ACM, pp. 26-34. 2005.
Cai et al,"Certified Self-Modifying Code", ACM, pp. 66-77, 2007.
Backes et al,"Computationally Sound Verification of Source Code", ACM, pp. 387-398, 2010.
Seshadri et al, "Pioneer: Verifying Code Integrity and Enforcing Untampered Code Execution on Legacy Systems", ACM, pp. 116, 2005.
Bernini et al, A Software Architecture for the Deployment of Executable Transformation Models ACM, pp. 47-51, 2009.
U.S. Appl. No. 15/084,242, Sep. 12, 2017, Final Office Action.
U.S. Appl. No. 15/084,242, Jan. 9, 2018, Notice of Allowance.

* cited by examiner

```
{
    "external" : true,
    "name" : "iam",
    "image" : "iam",
    "listenPath" : "/iam/",
    "ports" : [
        {
            "containerPort" : 80,
            "hostPort" : 80,
        }
    ]
}
```
↙ 750

CREATION AND USE OF DEVELOPMENT PACKAGES

RELATED APPLICATIONS

This application is related to U.S. patent application Ser. No. 15/084,242, entitled DEPLOY PIPELINE FOR CPS, filed the same day herewith, and incorporated herein in its entirety by this reference.

FIELD OF THE INVENTION

Embodiments of the present invention generally concern development, testing and deployment of code. More particularly, at least some embodiments of the invention relate to systems, hardware, computer-readable media, and methods directed to creation and use of development packages in connection with a deployment pipeline. In some embodiments, the code in the development packages can relate to data backup and restore functions.

BACKGROUND

Code developers often work as part of a group to develop software for implementing a variety of functions. Projects that are relatively large and/or require a variety of different software pieces may involve multiple developers. The developers for a project may be co-located at a common location, or may work at a variety of different locations, which can be widely dispersed. As well, and depending on considerations such as the particular nature and volume of their work, different developers or groups of developers may complete their work at different times. Moreover, where developers are organized in groups, each group of developers may have its own particular code building tools, and development structure and processes. As well, the programming languages used in the code writing processes may vary from one developer, or group of developers, to the next. In some cases, code written in one language must be translated to another language. Finally, at least some development processes involve the use of a single code base that is accessed and used by all of the developers. Such a single code base can be quite large.

Considerations such as those noted above can give rise to a variety of problems that can affect, among other things, the pace of the development process, deployment of the end product, and the quality of the end product. For example, because the developer groups may be dependent upon each other, the pace of development may be relatively slow and complicated. As well, the use of a single code base can present storage and availability problems, and also introduces complexity into the code development processes. Moreover, the use of different programming languages, testing requirements, code building tools, and other group-specific parameters, also tends to lend complexity to the overall process, and can slow the pace of development.

In view of problems such as those noted above, and others, it would be useful to provide processes and mechanisms that enable code packages to be developed, tested, and deployed, independently of each other. As well, it would be useful to create and implement a standardized code development structure and code deployment pipeline that can be used by a variety of developers or developer groups who may be working according to differing sets of constraints and parameters.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which:

FIG. 4b discloses aspects of an example container file structure; and

DETAILED DESCRIPTION OF SOME EXAMPLE EMBODIMENTS

Figure 1:
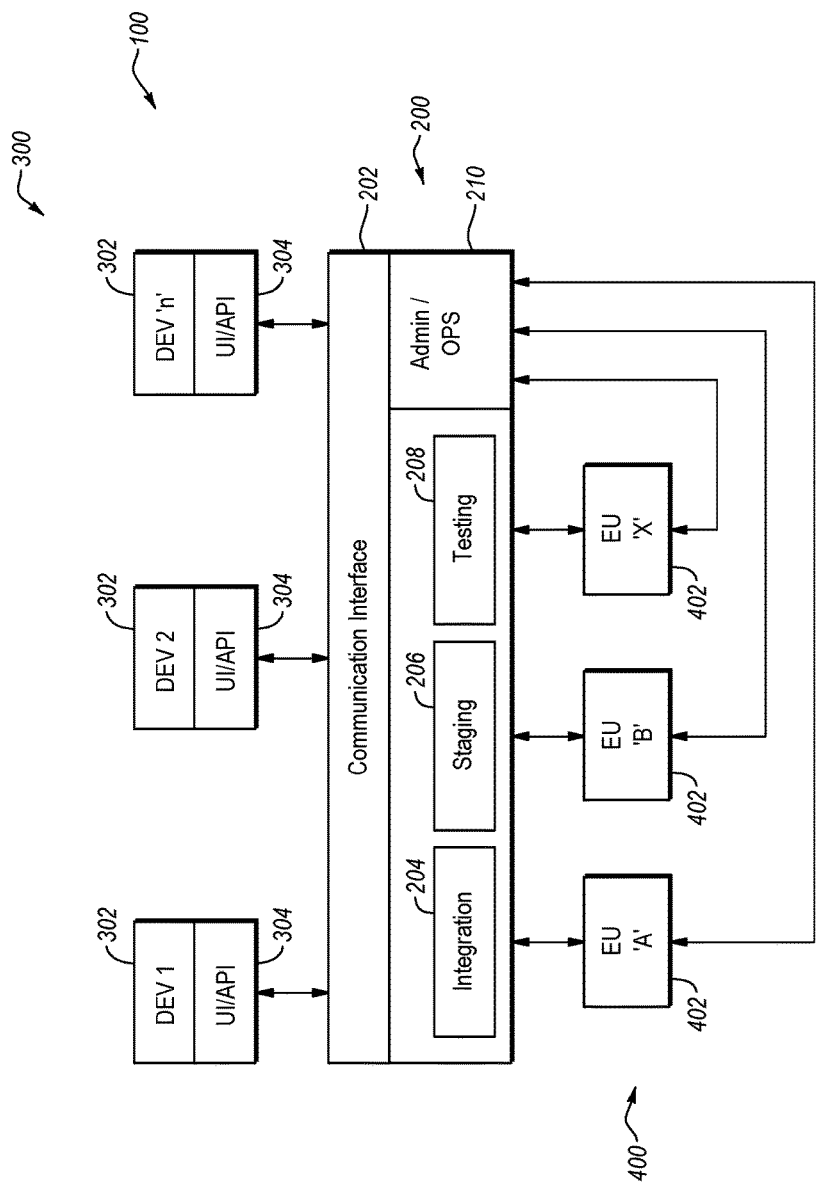
FIG. 1 is directed to aspects of an example operating environment for at least some embodiments.

Embodiments of the present invention generally concern development, testing, and deployment of code packages. More particularly, at least some embodiments of the invention relate to systems, hardware, computer-readable media, and methods directed to the implementation and use of a standardized code development structure that can be used by a variety of developers or developer groups who may be working according to differing sets of constraints and parameters. In some embodiments, the code can relate to services that may be used in cloud-based data backup and restore applications and functions, but that is not required, and embodiments of the invention can, more generally, be employed in connection with the development and deployment of any type of code for any application.

In at least some embodiments, code is developed in discrete packages, each of which may correspond to a particular service that can be provided as part of the operation of a larger application that includes the various code packages. Each of the code packages may be included in a respective development package. A development package can take the form of a folder structure and may include, in addition to a code package, the name of the service performed by the code package, a version code, an implementation directory, and a container. The container may include metadata, such as information and/or instructions concerning how to run the code package, and how to test the code package. The development package can be built by the developer, and all of the information in the development package can be specified, or generated, as applicable, by the developer. As well, the code in the development package can employ any programming language.

In connection with its creation and eventual deployment, the development package can move through a variety of stages. Such a grouping of stages, which can be arranged in serial fashion in some embodiments, can be referred to herein as a deployment pipeline. In some implementations, the stages of the deployment pipeline can be grouped together in various phases, such as an integration phase, a staging phase, and a production phase, for example. One or more stages of the deployment pipeline can be performed in the context of an environment, in the form of an environmental unit (EU), that has been specifically defined and constructed for performance of any process(es) associated with that stage. In some embodiments, movement through some, or all, stages of the deployment pipeline takes place automatically. Additionally, or alternatively, movement through some, or all, stages of the deployment pipeline can be a manual process that must be initiated by user, such as by way of a user interface (UI).

Advantageously then, at least some embodiments of the invention provide for the use of development packages and associated structures that can be developed, tested, and deployed, independently of each other. In some embodiments, such development, testing and deployment of the development packages can be performed in connection with a deployment pipeline, although that is not necessarily required.

A. Aspects of an Example Operating Environment

With attention now to FIG. 1, details are provided concerning an example operating environment 100 for at least some embodiments of the invention. The operating environment 100 may be a network such as a local area network, a wide area network, the internet, or any other networked configuration. Moreover, the operating environment 100, or any group of one or more of its elements, may comprise, form an element of, or constitute, a cloud computing environment. The operating environment 100 may include various devices including servers, clients and other computers and devices that are interconnected.

The example operating environment 100 can include a deployment pipeline 200 configured for communication, such as by way of a communication interface 202, with a group 300 of one or more instances of a developer application 302. A group 400 of one or more environmental units (EU) 402 is also provided and the EUs 402 are configured to communicate with the deployment pipeline 200. The instances of the developer application 302 can also access the EUs 402 by way of the deployment pipeline 200.

As further indicated in FIG. 1, the deployment pipeline 200 generally provides a variety of services to each of the instances of the developer application 302. Such services can be organized, for example, in an integration phase 204, a staging phase 206, and a testing phase 208. In general, operations during a phase occur independently of operations in any other phase. Administration/operations services 210 can also be provided by the deployment pipeline 200. Among other things, the administration/operations services 210 can handle the building of the EUs 402, and can coordinate operations within the deployment pipeline 200, as well as communications with the various instances of the developer application 302. Finally, the deployment pipeline 200 can be implemented as an application, or a group of applications, that are hosted on one or more corresponding host devices, such as one or more servers for example.

With continued reference to FIG. 1, each instance of the developer application 302 can be implemented as software that runs on a corresponding host device and enables a user to create and modify one or more development packages that can be submitted to the deployment pipeline 200. Each instance of the developer application 302 can run independently of the other instances of the developer application 302. A user operating an instance of the developer application 302 can communicate with the deployment pipeline 200 using any suitable interface 304, such as a User Interface (UI) or Application Program Interface (API) for example. The instances of the developer application 302 can each operate with the deployment pipeline 200 in a client-server, respectively, relationship.

As noted earlier, the operating environment 100 can include one or more EUs in connection with which operations of the deployment pipeline 200 are performed. The EUs are each configured to communicate with the deployment pipeline 200, and the EUs operate independently of each other. Management of the EUs, including their construction, configuration, and operation, can be implemented by and/or at the direction of the administration/operation service 210 of the deployment pipeline 200. There is no limit to the number of EUs that can be provided. An EU can be provided on an ad-hoc basis and then dismantled when no longer needed, or the EU can be persistent. The operating environment 100 can include both ad-hoc and persistent EUs. As well, one or more EUs can be cloned from an EU template and then further adapted to suit the needs of particular processes expected to be run in the EU.

B. Example Host Configuration

Figure 2:
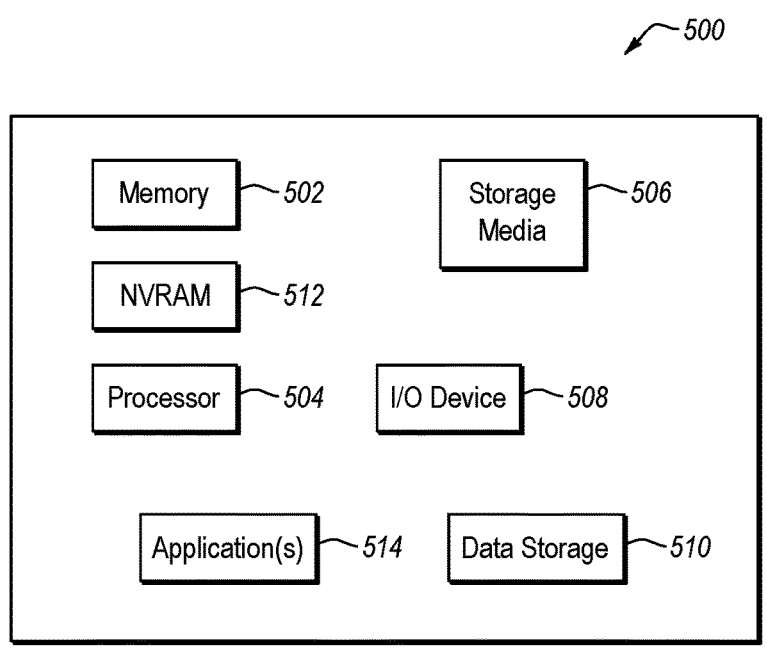
FIG. 2 discloses aspects of an example host device.

With reference briefly to FIG. 2, one or more of the deployment pipeline 200, instances of the developer application 302, and EUs 402 can consist of, comprise, or take the form of, one or more physical computing devices, one example of which is denoted at 500 in FIG. 2. In the example of FIG. 2, the computing device 500 includes a memory 502, one or more hardware processors 504, non-transitory storage media 506, I/O device 508, data storage 510, and NVRAM 512. As well, one or more applications 514 are provided that comprise executable instructions. Such executable instructions can take the form, for example, of any one or more of a developer application, a verification application, a build application, a test application, a deploy application, or any combination of these. As well, the executable instructions can implement any of the methods disclosed herein. Additional, or alternative, applications can likewise be included in the applications 514.

C. Example Development Package Structures

Figure 3:
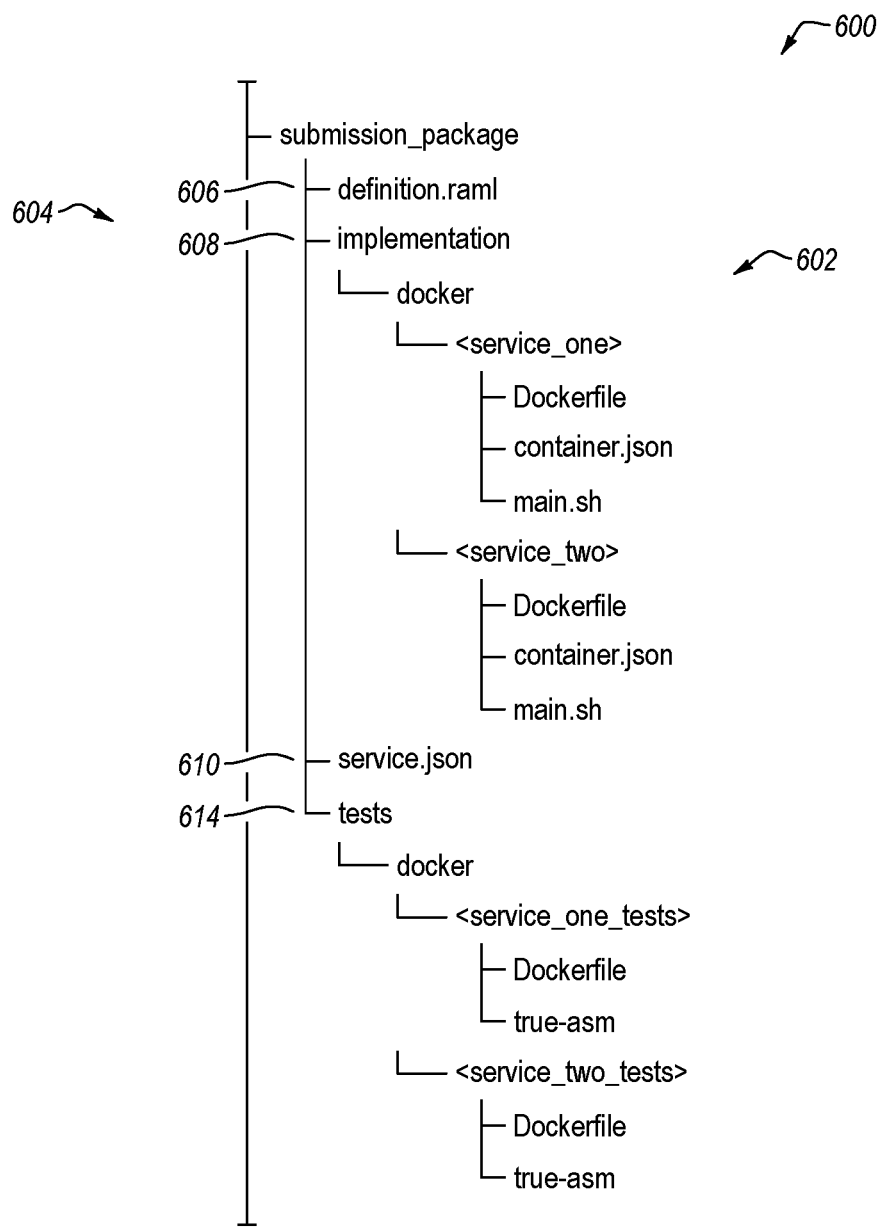
FIG. 3 discloses aspects of an example development package structure.

Turning now to FIG. 3, details are provided concerning structures for development packages. One example of such development packages is denoted generally at 600 and may be alternatively referred to as a submission package. In general, the development package 600 structure will be a standardized structure that is the same for all packages, regardless of any individual differences that may exist between the respective content of those packages. Such individual differences may include, for example, differences in any one or more of programming language, service provided by the developer code—also referred to herein as a 'microservice,' testing procedures, service metadata, service name, developer code version, testing criteria such as pass/fail criteria, operating system (OS), service dependencies, applicable environmental unit (EU), tokens, rules, application program interfaces (API), definition files, definitions, and ports, to name a few examples. In at least some embodiments, the development package 600 may have a data compression format, such as tar.gz, or .zip, for example, although any other suitable format, including data compression formats, could alternatively be used.

In at least some embodiments, the development package 600 can be built as a file structure 602, although any other suitable structure could be used. The development package 600 may have any suitable format. The development package 600 can implement a basic standardized structure that is common across all development packages, notwithstanding that each of the development packages may be concerned with providing a different respective service. In at least some embodiments, development packages 600 that do not conform with the standardized structure may be rejected at the verification stage of a deployment pipeline. Any variables in the development package 600 can also be checked at the verification stage to identify any potential problems that may occur downstream in the deployment pipeline. As well, a development package such as the development package 600 can be combined with one or more other development packages to form an integrated software package that is capable of providing multiple different microservices. This integration of multiple development packages can be performed in a deployment pipeline.

In the example of FIG. 3, the file structure 602 can be organized into a number of major segments 604, five in the illustrated example. These example segments 604 include a definition segment 606, an implementation segment 608, a service segment 610, and a test segment 614. One, some or all, of these segments can take the form of a directory, and each directory may, or may not, have one or more subdirectories. As such, in other embodiments, more, fewer, or alternative, segments can be employed. As well, one or more of the segments can be a single level segment, such as the definition segment 606, for example, while other segments such as the implementation segment 608, for example, can have one or more sub-directories. Further, the various segments 604 can have different respective formats, and the scope of the invention is not limited to the example formats illustrated. Thus, the structure disclosed in FIG. 3 is provided only by way of example. A discussion of aspects of each of the example segments in turn now follows.

With reference first to the definition segment 606, that segment can have a .raml format (RESTful API Modeling Language (RAML)). In general, the definition segment 606 can include the information that is necessary to describe RESTful APIs, or practically-RESTful APIs that do not necessarily conform with all the constraints of representational state transfer (REST). The definition.raml is an API definition file that includes information indicating how the developer code API should respond to the various requests that may be directed to it.

The next segment of the example file structure 602 is the implementation segment 608. In the illustrated example, the implementation segment 608, which can take the form of a folder for example, comprises a 'docker' portion and a 'service name' portion, although additional and/or other portions can be employed in other embodiments. Both of these portions can be implemented in connection with the open-source project, by the Docker company (https://www.docker.com), in the form of software and methods that automate the deployment of applications inside software containers, by providing an additional layer of abstraction and automation of operating-system-level virtualization on Linux. The scope of the invention is not confined to the use of the Docker product and methods however, and any other software and/or methods of comparable functionality can alternatively be employed. In general, the Docker product is operable to implement methods that enable a developer to build, ship, and run distributed applications.

The implementation segment 608 contains all the information for the containers, such as docker containers for example, which make up the microservice, that is, the service provided by the developer code. A container enables a developer to package an application, such as a microservice for example, with all of its dependencies into a standardized unit for software development. In more detail, a container wraps up a piece of software or developer code, such as a microservice, in a complete filesystem that contains everything that the software needs to run, including, but not limited to, code, runtime, system tools, system libraries, and anything that could be installed on a server. This approach helps to ensure that the developer code will always run the same, regardless of the environment it is running in.

With continued reference to FIG. 3, the 'docker' portion of the implementation segment 608, which includes a service name, also includes a 'Dockerfile' which is a docker specific configuration file which tells the docker daemon how to build the container. The 'container.json' (JSON or JavaScript Object Notation is a lightweight data-interchange format) is a metadata file which tells the deployment pipeline how to build and initialize the service, such as by specifying ports, health check endpoints, operating system (OS), where developer code for the microservice should be copied, container names, and other information. Thus, in contrast with a VM for example, the container.json of the dockerfile is concerned with running only a single process. The dockerfile can be retrievably stored in a repository and then retrieved and run by a container management system upon direction by a deployment pipeline. In some embodiments, the deployment pipeline may direct the container management system to run multiple instances of the dockerfile. The remaining files in the implementation segment 608 indicated in FIG. 3 are source code for a given microservice, and would therefore be different for each microservice.

As noted above, the example file structure 602 includes a service segment 610. The service segment 610 can take the form of a service.json file. This file is a metadata file for the service included in the development package 600, and is specific to running that service within a particular environment, such as an environmental unit (EU) for example.

Finally, the test segment 614, which can take the form of a folder for example, generally contains all the information for the containers, which can be docker containers, which test the microservice. In more detail, the 'Dockerfile' is the docker specific configuration file which tells the docker daemon how to build a test container for the microservice with which the development package 600 is concerned. While not specifically indicated in FIG. 3, the test segment 614 can also include a metadata file, which may be in the form of a container.json for example, that is a metadata file, which tells the pipeline how to build and initialize tests relating to the microservice with which the development package 600 is concerned.

Figure 4A:
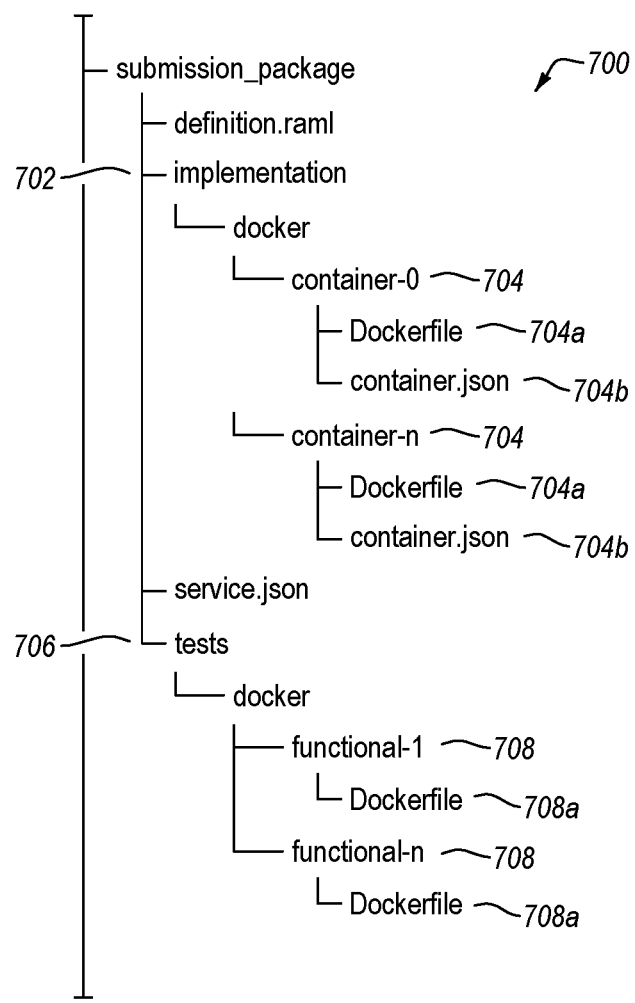
FIG. 4a discloses aspects of an example service file structure.

With continued reference to FIG. 3, and directing attention now to FIGS. 4a and 4b, details are provided concerning example service file structures that can be employed in connection with development packages, such as the example development package 600. One example service file structure is denoted generally at 700 in FIG. 4a. As aspects of the service file structure 700 can be similar, or identical, to those disclosed in FIG. 3, only selected differences are specifically addressed below.

For example, and as shown in FIG. 4a, an implementation segment 702, which can be a directory, may include multiple containers 704, such as containers 1 . . . n. Each of those containers 704 can include a respective dockerfile 704a and container.json 704b. As such, the service file structure 700 can embrace multiple different microservices, each of which is associated with each container 704.

As well, a test segment 706 can be included as part of the service file structure 700. Similar to the case of the implementation segment 702, the test segment 706 can be a directory, and may include multiple tests 708, such as tests functional-1 . . . functional-n. Each of the tests 708 can correspond to a respective container 704, and each of the tests 708 can include a respective dockerfile 708a.

With continued reference to FIG. 4a, and directing attention now to FIG. 4b as well, details are provided concerning a container file, one example of which is denoted at 750. In this example, the container file 750 takes the form of a container.json file. In general, the container file 750 includes service specific information that relates to deployment of an associated microservice. As such, the service specific information can include, but is not limited to, the name of the service, and ports to be used by the service.

D. Example Operations for Development Packages

Figure 5:
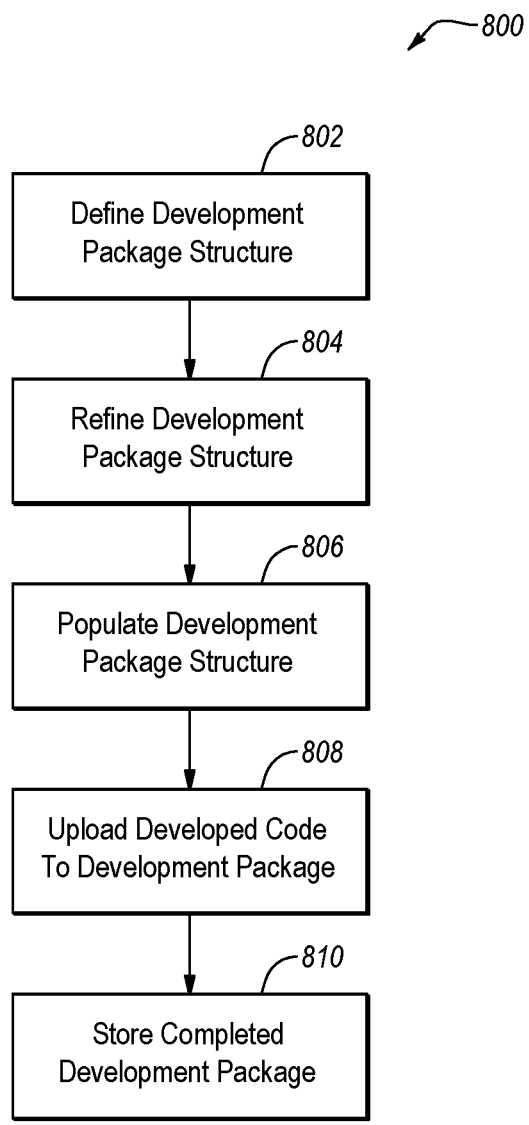
FIG. 5 is a flow diagram that discloses aspects of an example method for building a development package.

Directing attention now to FIG. 5, details are provided concerning various methods and processes involving development packages. One example method is denoted generally at 800 in FIG. 5. Initially, the method 800 can begin when a basic development package structure is defined 802. The basic development package structure can take any suitable form and, in some embodiments, is implemented in the form of a file structure. The development package structure, at this stage, can be highly generalized in its form. For example, the development package structure may contain as few as one directory, which may or may not have any sub-directories at this stage.

Once the basic development package structure has been defined 802, the development package structure can then be further refined 804 with various directories and sub-directories. In at least some embodiments, the refinement process 804 can involve creation of any combination of the directories and sub-directories illustrated in FIGS. 3, 4a, and/or 4b. In one particular embodiment, the refinement 804 of the basic development package structure comprises creating a definition directory, an implementation directory, a service directory, and a test directory, for example. One or more of these directories, such as the implementation directory and test directory for example, can further include one or more sub-directories and/or files. Thus, an implementation directory can include, for example, both 'docker' and 'service_name' subdirectories, which can each include one or more sub-directories and/or files. As another example, the test directory can include a 'docker' subdirectory that in turn includes a 'service_name' subdirectory. In general, the creation 802 and refinement 804 of the development package structure should be consistent with requirements that can be imposed, for example, by hardware, software, a deployment pipeline, and environmental units (EU). Because the development package structure is identical, or nearly so, from one development package to the next, the development packages can be readily handled by a deployment pipeline, and are relatively easy to integrate together to define and implement a particular service, or services.

After the development package structure has been refined 804, the development package structure may then have a basic skeletal form that can then be appropriately populated by any developer. In some cases, once the development package structure has been refined 804, it can be used as a template to quickly create additional development package structures that can be used by other developers. The developer can then populate 806 the various portions of the development package structure to suit the particular code that the developer intends to create. This population 806 can include for example, specifying tests, test criteria, hardware and infrastructure requirements, APIs, and any other information that may be needed to run, test, revise, and/or diagnose the developer code once it has been completed and included in the development package. This population can also help to ensure compliance of the associated development structure with applicable requirements.

After the development package structure has been populated 806, and then verified, such as by a deployment pipeline, the developer can then create the developer code and upload 808 the developer code to the development package. The development package structure can include instructions, metadata, and other information concerning, for example, where the developer code should be stored in the development package, how the developer code should be run, and how the developer code should be tested.

Finally, if the development package is not to be tested immediately, the development package can be stored 810 in a repository that can be accessed, for example, by a container management system of a deployment pipeline. The stored development package may also be accessible by one or more developers.

As noted elsewhere herein, and in the 'Related Application' the development package and associated structure can provide a variety of possible advantages. One additional advantage is that it is relatively easy to roll back to a different version of the development package after it has been deployed. For example, if a developer decides to roll back from version 2.2 to version 2.1, the developer can simply deploy version 2.1 and such deployment results in the overwrite of version 2.2. Consequently, it is relatively easy for a developer to perform code deploys without dependence on other personnel. Among other things, such autonomy on the part of the developer can contribute to a faster pace of development, integration, and deployment of developer code and associated microservices.

It will be apparent that a number of variations, additions and refinements to the method 800 are possible. For example, in connection with the code development process that occurs prior to stage 808, a developer may create a stand-alone integration environment that can be used to evaluate various aspects of the developer code before the completed development package is actually submitted to a deployment pipeline. By way of illustration, the stand-alone integration environment, which could take the form of an EU for example, can be employed to test service dependencies, that is, other services that will interact with the developer code, identified by the development package. Such a stand-alone integration environment can be allowed to persist for further testing processes or, alternatively, can be shut down when testing is completed. The stand-alone integration environment can be created and used on a client machine used by the developer or, alternatively, at a server accessed by the client machine of the developer.

The tests performed in the stand-alone integration environment can be included, along with applicable test criteria, as part of the populated development package structure. Moreover, the tests can be the same as, or different, than tests conducted as part of the deployment pipeline processes.

Some further examples of variations, additions and refinements to the method 800 relate to deployment of the development package after it has been completed. In general, after the development package has been completed, it can be deployed in an integration environment and applicable test container of the development package can be initiated to test the deployed instance of the development package. Further details concerning such deployment and testing are set forth in the application identified in the 'Related Applications' section of this application. With regard to such testing, the development package can include, for example, information indicating how the test (or tests) is to be run, including an interface that can be used to trigger the test, and mechanisms for reporting test results to the developer and/or other entities.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, switch, server, database, or storage node may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    defining a development package structure of a development package that comprises a portion of an application which, at a time that the development package structure is defined, is not completely developed;
    refining the development package structure to include a definition directory, an implementation directory that includes one or more containers, a service directory, and a test directory, wherein after refinement, the development package structure is usable as a development template for creation of another development package;
    populating one or more of the definition directory, the implementation directory, the service directory, and the test directory, wherein the test directory, when populated, comprises instructions concerning the construction and initialization of test code relating to a microservice with which the development package is associated, and wherein population of one or more directories of the development package structure facilitates compliance of the development package structure with one or more applicable requirements;
    uploading developer code to the development package;
    retrievably storing the development package;
    in a stand-alone integration environment configured to enable evaluation of the developer code, testing, or causing the testing of, the developer code of the development package, wherein testing of the developer code comprises executing the test code; and
    when the testing reveals a problem with the developer code, implementing, or causing the implementation of, a revision to the developer code, and causing execution of the test code with respect to the revised developer code.

2. The method as recited in claim 1, wherein the developer code is stored in one of the containers.

3. The method as recited in claim 1, wherein the development package has a data compression format.

4. The method as recited in claim 1, wherein the developer code is specific to a particular microservice.

5. The method as recited in claim 1, wherein the development package structure is in the form of a file structure.

6. The method as recited in claim 1, wherein the development package structure includes information concerning the location of the developer code, and a location of test code.

7. The method as recited in claim 1, wherein the development package is configured to be integrated together with one or more other development packages, each of which has the same development package structure.

8. The method as recited in claim 1, wherein the development package is configured such that the developer code can be developed, run, and tested, independently of any other developer code or development package.

9. The method as recited in claim 1, wherein the development package is configured to be run and tested in an environmental unit specifically configured for compatibility with the development package.

10. The method as recited in claim 1, further comprising receiving verification information concerning one or both of the structure and content of the development package, wherein the verification information indicates an extent to which the structure and/or content of the development package conform to a standard development package structure.

11. The method as recited in claim 1, wherein the definition directory, when populated, comprises information concerning how a developer code application program interface (API) should respond to a request directed to the developer code API.

12. The method as recited in claim 1, wherein the test code comprises a functional test.

13. The method as recited in claim 1, further comprising submitting the development package to a deployment pipeline.

14. The method as recited in claim 1, wherein the developer code is written in a programming language that is different from a programming language of developer code that is included in a related development package.

15. The method as recited in claim 1, wherein an operating system associated with the development package is different from an operating system associated with a related development package.

16. A non-transitory storage medium having stored therein computer-executable instructions which, when executed by one or more hardware processors, implement and/or cause the implementation of the following processes;
    defining a development package structure of a development package that comprises a portion of an application which, at a time that the development package structure is defined, is not completely developed;
    refining the development package structure to include a definition directory, an implementation directory that includes one or more containers, a service directory, and a test directory, wherein after refinement, the development package structure is usable as a development template for creation of another development package;
    populating one or more of the definition directory, the implementation directory, the service directory, and the test directory, wherein the test directory, when populated, comprises instructions concerning the construction and initialization of test code relating to a microservice with which the development package is associated, and wherein population of one or more directories of the development package structure facilitates compliance of the development package structure with one or more applicable requirements;
    uploading developer code to the development package;
    retrievably storing the development package;
    in a stand-alone integration environment configured to enable evaluation of the developer code, testing, or causing the testing of, the developer code of the development package, wherein testing of the developer code comprises executing the test code; and
    when the testing reveals a problem with the developer code, implementing, or causing the implementation of, a revision to the developer code, and causing execution of the test code with respect to the revised developer code.

17. A server, comprising:
    one or more hardware processors; and
    the non-transitory storage medium as recited in claim 16.

18. The non-transitory storage medium as recited in claim 16, wherein one or more of the recited processes are performed by a developer client application.

19. The non-transitory storage medium as recited in claim 16, wherein the development package is configured to be integrated together with one or more other development packages, each of which has the same development package structure.

20. The non-transitory storage medium as recited in claim 16, wherein the development package structure is in the form of a file structure.

* * * * *